April 10, 1951   L. B. GOODSON ET AL   2,548,015
CATALYTIC HYDROGENATION AND APPARATUS THEREFOR
Filed Sept. 19, 1947   2 Sheets-Sheet 1

INVENTORS
L. B. GOODSON
J. A. GUYER
BY Hudson and Young
ATTORNEYS

INVENTORS
L. B. GOODSON
J. A. GUYER
BY
Hudson and Young
ATTORNEYS

UNITED STATES PATENT OFFICE 2,548,015

CATALYTIC HYDROGENATION AND APPARATUS THEREFOR

Luke B. Goodson and Jesse A. Guyer, Bartlesville, Okla., assignors to Phillips Petroleum Company, a corporation of Delaware Application September 19, 1947, Serial No. 775,036

6 Claims. (Cl. 196—78)

This invention relates to a method and apparatus for catalytically converting fluids. In one of its more specific aspects it relates to a method and apparatus for hydrogenating hydrocarbons.

In many catalytic processes such as hydrogenolysis, catalytic cracking, hydroforming, etc., a part of the reactants are unreacted or unconverted as they pass through the catalytic zone. The amount of conversion taking place may depend upon many things, such as the reactant feed, type catalyst being used, temperature, speed of reactant flow through the conversion zone and the activity of the catalyst. It is obvious that in order to get the most economical operation it is desirable to operate at the optimum conversion. The highest possible conversion per pass is not always the optimum. For example, in catalytic cracking or hydrogenolysis higher conversion per pass is usually accompanied by higher gas formation and consequently greater loss. To avoid these excessive losses it is usually necessary to operate at lower conversion rates. This means that more of the unconverted reactants must be recycled through the reaction zone.

In carrying out these recycling operations the total effluent from the reaction zone is usually fractionated and the unconverted portion returned to the reaction zone. This, especially in processes operating at higher temperatures, results in appreciable heat losses. This fractionation of the reaction chamber effluent necessitates additional handling equipment such as storage, pumps, etc. We have found a means whereby the unconverted portion of the reactant charge may be recycled without any loss in heat content. Furthermore, when using our invention, any need for additional handling equipment such as storage, transfer pumps, etc., is eliminated. We have also found a means whereby the degree of conversion of the materials withdrawn from the reaction chamber may be controlled within wide limits.

These improvements in the art are accomplished by providing a reaction chamber wherein the liquid phase, from the reaction zone, is collected in the bottom of said chamber and is returned to the reaction zone, along with all or part of the fresh feed, by means of an internal injection device. We have, in one modification of the invention, provided means whereby, when working with heavy hydrocarbons such as fuel oils, residues, tars, etc., that portion of the reaction zone effluent which collects in the bottom of the reaction chamber may be kept in contact with catalyst at all times, thereby reducing the tendency of these heavy oils to form coke or other undesirable reaction products. The degree of conversion of the material withdrawn from the reaction chamber may be controlled within wide limits by varying the quantities of the reactants introduced through the two injection means provided.

An object of the invention is to provide an improved method for carrying out catalytic reactions. Another object of the invention is to provide an improved reaction chamber for carrying out catalytic reactions. Another object of the invention is to provide a process for carrying out catalytic reactions with the greatest possible economy. Another object of the invention is to provide an apparatus for carrying out catalytic reactions with the greatest possible economy. Another object is to provide a catalytic reaction chamber which is compact and utilizes heat carried from the reaction zone by unreacted materials. Another object of this invention is to provide a process and apparatus for carrying out catalytic hydrogenation reactions. Another object of the invention is to maintain intimate contact between catalyst material and unreacted materials for extending periods of time. Another object of the invention is to provide a process wherein unconverted reactant materials are utilized in combination with fresh feed for such reaction. Another object of the invention is to provide an apparatus wherein unconverted reactant materials are utilized in combination with fresh feed for such reaction. Other objects and advantages of the invention will be apparent to those skilled in the art from the accompanying description, the drawing, and the claims.

Although this apparatus, and the process for its use, are highly advantageous when used in destructive and non-destructive hydrogenation of liquid hydrocarbons, this invention is not intended to be limited to such reactions. The apparatus and method for utilizing it are equally advantageous when used in catalytic cracking, catalytic reforming, hydroforming, and polymerization reactions where a liquid is one of the reactants or reaction products.

Figure 1 of the drawing is a cross-section elevational view of a preferred embodiment of our invention.

Figure 1:
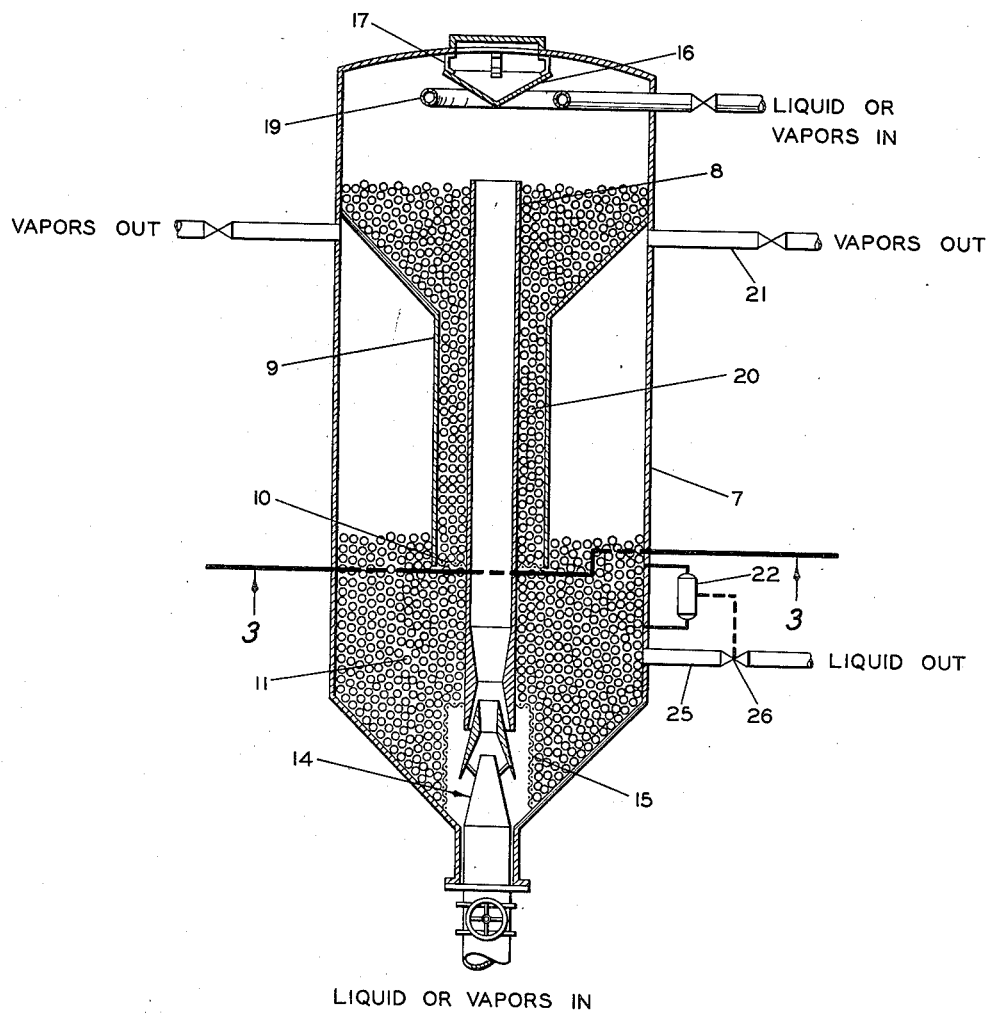
Figure 3:
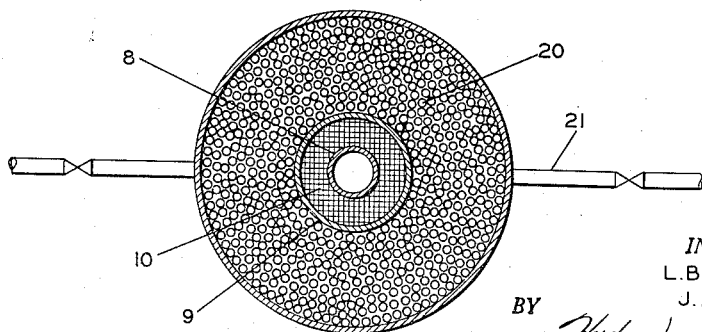
Figure 3 is a cross-sectional view taken along the 3—3 line of Figure 1.

In Figure 1 the apparatus of our invention has a confined outer chamber 7 having a substantially conical shaped bottom and which has an interior chamber 8 extending coaxially from a point in the bottom portion of said outer chamber to a point in the upper portion of said outer chamber. Surrounding a portion of interior chamber 8 within outer chamber 7 and also extending coaxially therewith is intermediate interior chamber 9, which intermediate chamber extends upwardly from a point substantially above the bottom of said interior chamber and is belled or funneled outwardly in its upper portion so that it makes a gas-tight seal at its outer periphery with said outer chamber. A perforate catalyst support 10, such as a tray or screen, may be provided at the bottom of intermediate chamber 9 so as to close off the space formed between interior chamber 8 and intermediate chamber 9 and to form trap 11 outside of intermediate chamber 9 for reaction materials therefrom. Injector means 14 are provided in the conical bottom of outer chamber 7 and are inserted into the bottom of interior chamber 8 for the purpose of injecting fluids into and through said interior chamber. Passage means, such as screen 15, are provided for the purpose of furnishing communication between the chamber formed by outer chamber 7 and interior chamber 8 and injector means 14. Deflector means 16 are provided above interior chamber 8 so as to spread the fluids rising through interior chamber 8 to force them outwardly. Such deflector means may be supported in any conventional manner but are preferably suspended from the top of outer chamber 7 by means of removable brackets 17. Upper fluid injector or inlet means such as header 19 are provided, above the catalyst bed, in the upper portion of chamber 7 so as to inject additional fluids into admixture with fluids injected through injector means 14 and interior chamber 8. Injector means 14 and 19 may have valve means positioned therein to control the flow of fluid therethrough. The space between interior chamber 8 and intermediate chamber 9 is filled with a particulate solid catalytic material 20. The space in the bottom of outer chamber 7, formed between said outer chamber, perforate means 15, and interior chamber 8, is also filled with catalytic material 20 to a point slightly above the level of catalyst support 10 and surrounding the bottom portion of intermediate chamber 9. Outer chamber 7 is provided with a vapor outlet 21, or a plurality of such outlets in its walls, at a point below that at which the upper end of intermediate chamber 9 makes a gas-tight seal with outer chamber 7 and at a point above the catalyst in the bottom of chamber 7. Liquid level control means 22 communicates with the interior of outer chamber 7 at a point above the level of said injector means 14 but below the level of the catalyst in trap 11. Liquid outlet 25 is provided in the wall of outer chamber 7, at a point below control means 22, and is provided with valve 26 to control the flow of liquid therethrough. Valve 26 is actuated by control means 22.

In the operation of the device diagrammatically disclosed in Figure 1, for the purposes of carrying on a hydrogenation reaction, a fluid such as pre-heated hydrogen or pre-heated hydrocarbon, or a mixture of the two, may be injected upwardly through the injector means, and interior chamber and will be spread by deflector means 16 so as to be caused to pass downwardly through the catalyst material, contained in the space between the intermediate chamber and the interior chamber. If a single fluid is injected through the lower injector means, its counterpart of the reaction may be injected through the upper injector means. Thus if a pre-heated hydrocarbon were injected through the lower injector means, pre-heated hydrogen could be injected through the upper injector means so as to contact the hydrocarbon in its passage through the reaction zone. It is thus also possible to inject pre-heated hydrogen through the lower injector means and pre-heated hydrocarbon through the upper injector means, or in some cases it will prove most desirable to inject a mixture of pre-heated hydrogen and hydrocarbon through the lower injector means and add an additional portion of either one or both fluids through the upper injector means. As these fluids pass through the reaction zone, portions of the hydrogen and hydrocarbon are reacted together and as the reactant materials pass through the catalyst support and into the reactant materials trap, materials having a critical temperature below the temperture of this zone will exist as a vapor and will separate from liquid materials and pass from the reaction chamber through outlet 21. The gaseous materials will thus pass upwardly through the catalyst surrounding the bottom of the intermediate chamber and may be removed from the space above such catalyst through the vapor outlets. In the meantime the liquid materials are maintained in contact with catalyst material in the bottom of the trap and as fluids are injected through the lower injector means, liquid is drawn from the trap into the injector means and is carried, by the fluid stream therefrom, upwardly to the top of the chamber where the mixture is allowed to flow through the reaction chamber once more. It is necessary to constantly maintain a sufficient space in said trap so that the vapors and liquid will separate properly. The liquid level control tends to maintain a pre-determined liquid level in the trap. If liquid in the trap tends to rise above a pre-determined level, the control means actuates the valve in the liquid outlet so as to open said valve and allow liquid to flow from the trap. As liquid in the trap once more reaches a predetermined desired level, the control means once more actuates the valve to throttle or shut off the flow of liquid through the liquid outlet.

Catalytic reactions such as hydrogenation oftentimes require rigid temperature control to maintain the proper conversion of reactants. In the process of our invention pre-heat means, not shown, for fluids being injected through the lower injector means and upper injector means, may be regulated by thermostatic means, not shown, in the liquid outlet, vapor outlet, or trap. Some reactions, such as hydrogenation, are exothermic and will, after a short period of operation, tend to provide their own heat of reaction so that the operation of pre-heat means may be reduced to a considerable extent. On the other hand, other catalytic reactions, such as catalytic cracking, are endothermic and will require greater amounts of heat of reaction to be furnished, thus requiring the pre-heat means to furnish variably greater amounts of heat therefor.

Figure 2:
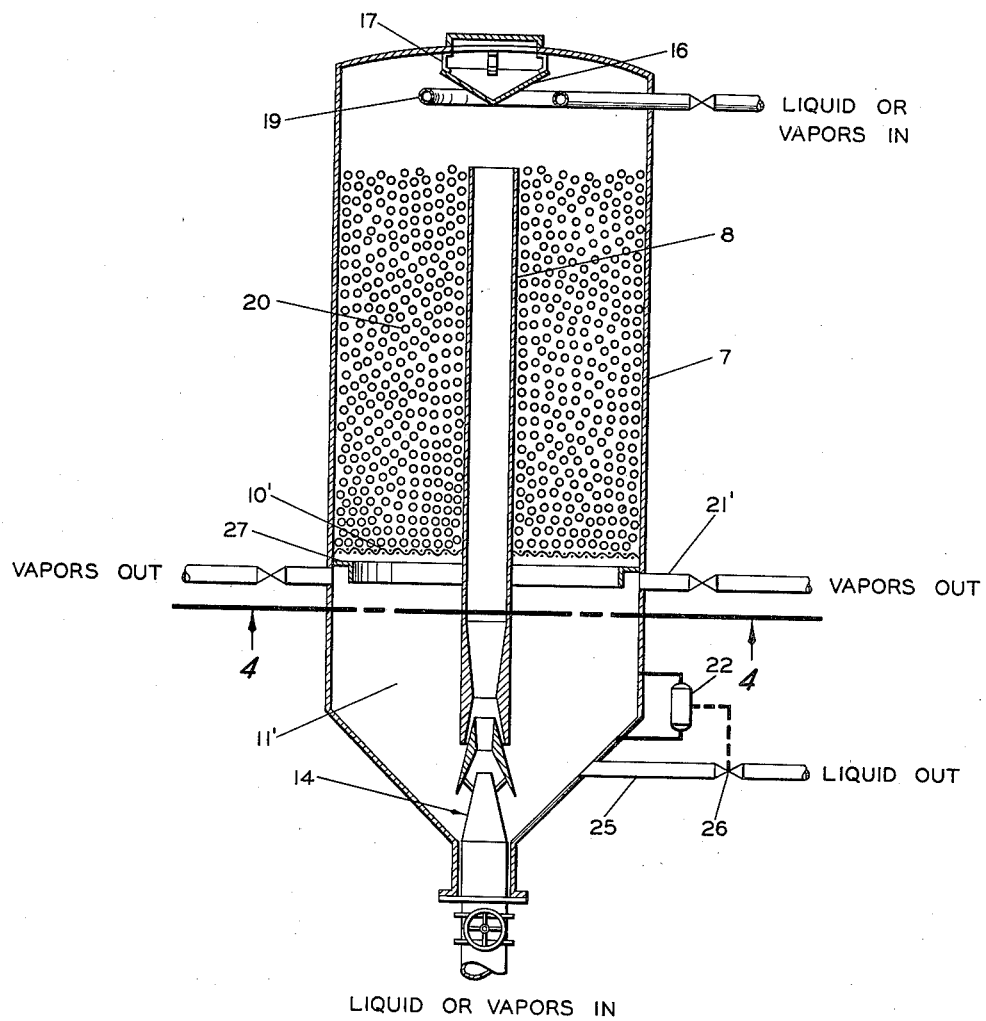
Figure 2 is also a cross-section elevational view which shows a modification of the device of our invention.
Figure 4:
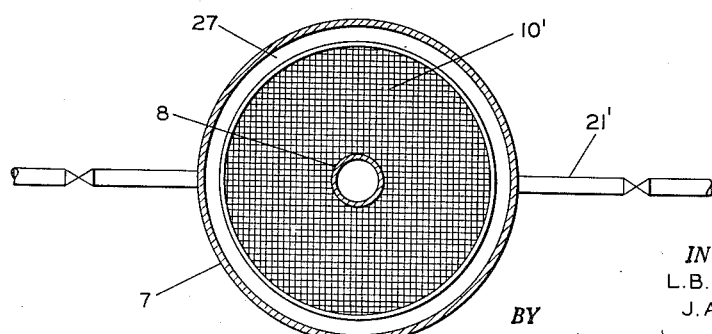
Figure 4 is a cross-sectional view taken along the 4—4 line of Figure 2.

The device of Figure 2, as that of Figure 1, has a confined outer chamber 7 having, preferably, a conically shaped bottom and an interior chamber 8 extending coaxially therein from a point in the bottom portion of said outer chamber to a point in the upper portion of said outer chamber. Confined chamber 7 has positioned in its conical bottom, injector means 14 which extends into chamber 8 and supplies and injects fluids into and through said interior chamber. Catalyst support means 10', such as a screen or grid, are provided in said outer chamber at a point substantially above the bottom of said interior chamber but below the middle of said chamber. Means 10' extends from said interior chamber to said outer chamber so as to divide the space outside said interior chamber into two portions. The portion above said support means is filled with particulate solid catalytic material 20 thus forming a reaction bed. The portion of said chamber below the catalyst support means forms a reaction material trap 11'. Outer chamber 7 is provided in its walls, near the top of said reaction material trap, with a vapor outlet 21' or a plurality of such outlets. Baffle means 27 is provided within said chamber to direct vapors into outlets 21'. Outer chamber 7 is also provided in said reaction materials trap, at a point spaced from the bottom of said trap, with liquid outlet conduit means 25. Conduit means 25 is also provided with valve 26 to control the flow of liquid therethrough. Liquid level control means 22 communicates with the interior of tank 7 at a point below said vapor outlet but above said liquid outlet. Control means 22 communicates with valve 26 so as to actuate valve 26 in response to the liquid level within the reaction products trap. Deflector means 16 is provided on the interior of chamber 7, at a point a short distance above interior chamber 8, and is preferably suspended from the top of said outer chamber by means of removable brackets 17. Upper fluid injector means such as header 19 is provided, above said catalyst bed, in the upper portion of said outer chamber.

The operation of the apparatus diagrammatically disclosed in Figure 2 is essentially the same as that of the device diagrammatically disclosed in Figure 1. A fluid or a mixture of fluids may be injected upwardly through the injector means, the interior chamber, and against the deflector means, by which means they are caused to spread outwardly against the sides of the outer chamber. An additional fluid or fluids may be injected through the upper injector means so as to enter into admixture with the fluids from the lower injector means, which admixture passes downwardly through the catalyst containing reaction zone, through the catalyst support, and into the reaction materials trap. Any material having a critical temperature below the temperature of this zone will exist as a vapor and will separate from the liquid materials. These vapors are removed from the reaction materials trap through the vapor outlet or outlets in the upper portion of the trap. Liquids collect in the bottom of the trap and are drawn, by the fluid flow through the injector means, into the fluid stream being injected upwardly through the interior chamber. As the liquid level within the trap rises above a predetermined level, the control means actuates and opens the valve in the liquid outlet, thus allowing fluid to run out of the reaction materials trap. As the liquid level is decreased below the predetermined level, the control means once again actuates the valve to throttle or shut off flow of liquid through the liquid outlet. In this embodiment of the invention pre-heat means, not shown, for the reactant feed may also be controlled in accordance with the temperature shown by heat indicating means, not shown, communicating with either the vapor outlet, liquid outlet or the reaction materials trap.

The catalyst material which may be used in this apparatus may be any particle form or pelleted catalyst. In general as examples of such materials, we may use fuller's earth and other natural clays, acid refined natural clays, synthetic clays, co-precipitated gels and other synthetic materials, any of which may in itself be catalytic so as to produce the desired reaction or which may act as a support or carrier for some other material which will give the desired catalytic reaction. In general, these materials are utilized in the form of granules obtained by crushing larger masses or as pills, pellets, spheres or rods obtained by pelleting, tableting, extrusion and similar processes.

It is not intended that the form of the bottom of the outer chamber should be limited to a conical shape. It is, instead, only necessary that the bottom be formed so that liquid in the bottom of the trap shall be directed toward the injector means.

As will be evident to those skilled in the art, various modifications of this invention can be made, or followed, in the light of the foregoing disclosure and discussion, without departing from the spirit or scope of the disclosure or from the scope of the claims.

We claim:

1. A catalytic conversion chamber comprising in combination, a confined outer chamber having an interior chamber therein, which interior chamber is open at each end; lower fluid injector means in the bottom of said outer chamber and positioned so as to inject fluid through said interior chamber; a catalyst bed about the exterior of said interior chamber; upper fluid injector means in said outer chamber and above the level of said catalyst; deflector means above said interior chamber and positioned so as to cause fluid flowing through said interior chamber to contact fluid injected through said upper fluid injector means; a trap within said outer chamber but surrounding said interior chamber, a vapor outlet in the upper portion of said trap; a valve in said vapor outlet to control the flow of vapors therethrough; control means communicating with the interior of said trap and responsive to the liquid level therein; a liquid outlet in said trap below the level of said vapor outlet; a valve in said liquid outlet which is actuated by said liquid level responsive control means; and passage means communicating between said trap and said injector means in the bottom of said outer chamber, so as to allow passage of fluid from said trap to said injector means.

2. A catalytic conversion chamber comprising in combination, a confined outer chamber having an interior chamber therein, which interior chamber is open at each end; fluid injector means in the bottom of said confined chamber, which means is positioned so as to inject fluid through said interior chamber; an intermediate interior chamber surrounding a considerable portion of, and considerably larger in diameter than said interior chamber, which intermediate chamber is flared at the top so as to form a gas tight seal at its periphery with said outer chamber; a perforate catalyst support at the bottom of said intermediate chamber closing off the space formed between said interior and intermediate chambers; a catalyst bed in said space between said interior and intermediate chambers forming a reaction chamber therein; upper fluid injector means in said outer chamber, which means is positioned above the level of said catalyst and said intermediate chamber; deflector means above said interior chamber, which means is positioned so as to cause fluid flowing out of said interior chamber to contact fluid injected through said upper fluid injector means; a fluid trap outside said intermediate chamber; a catalyst bed in the lower portion of said trap; a vapor outlet in the upper portion of said trap; a valve in said vapor outlet to control the flow of vapors therethrough; control means communicating with the interior of said trap and responsive to the liquid level therein; a liquid outlet in the lower portion of said trap; a valve in said liquid outlet which is actuated by said liquid level responsive control means; and passage means communicating between said trap and said injector means in the bottom of said outer chamber so as to allow the passage of fluid from said trap to said injector means.

3. A catalytic conversion chamber comprising in combination, a confined outer chamber having an interior chamber therein, which interior chamber is open at each end; fluid injector means in the bottom of said confined chamber, which means is positioned so as to inject fluid into and through said interior chamber; an intermediate interior chamber surrounding a considerable portion of, and considerably larger in diameter than said interior chamber, which intermediate chamber is flared at the top so as to form a gas tight seal at its periphery with said outer chamber; a perforate catalyst support at the bottom of said intermediate chamber closing off the space formed between said interior and intermediate chambers; a catalyst bed in said space between said interior and intermediate chambers forming a reaction chamber therein; upper fluid injector means in said outer chamber, which means is positioned above the level of said catalyst and said intermediate chamber; valve means in said upper fluid injector means to control flow of fluid therethrough; deflector means positioned so as to cause fluid flowing out of said interior chamber to contact fluid injected through said upper fluid injector means; a trap, outside said intermediate chamber, for reactant materials; a catalyst bed in the lower portion of said trap; a vapor outlet in the upper portion of said trap; a valve in said vapor outlet to control the flow of vapors therethrough; control means communicating with the interior of said trap and responsive to the liquid level therein; a liquid outlet in the lower portion of said trap; a valve in said liquid outlet which is actuated by said liquid level responsive control means; valve means in said lower injector means to control flow of fluid therethrough; and passage means communicating between said trap and said injector means in the bottom of said outer chamber so as to allow the passage of fluid from said trap to said injector means.

4. A catalytic conversion chamber comprising in combination, a confined outer chamber having an interior chamber therein, which interior chamber is open at each end; fluid injector means in the bottom of said confined chamber, which means is positioned so as to inject fluid through said interior chamber; an intermediate interior chamber surrounding a considerable portion of, and considerably larger in diameter than said interior chamber, which intermediate chamber is flared at the top so as to form a gas-tight seal at its periphery with said outer chamber; a perforate catalyst support at the bottom of said intermediate chamber closing off the space formed between said interior and intermediate chambers; a catalyst bed in said space between said interior and intermediate chambers forming a reaction chamber therein; a fluid trap outside said intermediate chamber; a catalyst bed in the lower portion of said trap; a vapor outlet in the upper portion of said trap; a liquid outlet in the lower portion of said trap; and passage means communicating between said trap and said injector means in the bottom of said outer chamber so as to allow the passage of fluid from said trap to said injector means.

5. A method for catalytically reacting at least two fluids together in a confined chamber, which comprises the steps of injecting, under pressure, a mixture of at least two co-reactable fluids through an injection zone and through a transmission zone under such conditions that substantially no reaction takes place therein; passing said admixture of reactable fluids downwardly into a bed of particulate solid catalyst in a reaction zone; chemically reacting said co-reactable materials in the presence of said catalyst in said reaction zone; passing resulting reaction products and unreacted materials from said reaction zone into a collection zone containing additional said catalyst; separating vaporous materials from liquid materials in said collection zone; removing said vaporous materials from said collection zone and said chamber; maintaining a body of said liquid material in contact with said catalyst in said collection zone; and admixing with said injected co-reactable fluids in said injection zone a portion of said liquid materials from said collection zone.

6. The method of claim 5, wherein said mixture of at least two co-reactable fluid consists essentially of hydrogen and hydrocarbon material.

LUKE B. GOODSON.
JESSE A. GUYER.

REFERENCES CITED

The following references are of record in the file of this patent:

UNITED STATES PATENTS

| Number | Name | Date |
|---|---|---|
| 1,972,948 | Payne | Sept. 11, 1934 |
| 2,018,778 | Ebner | Oct. 29, 1935 |
| 2,301,044 | Heard et al. | Nov. 3, 1942 |
| 2,319,508 | Le Prestre et al. | May 18, 1943 |
| 2,365,751 | Drennan | Dec. 26, 1944 |
| 2,378,728 | Roach | June 19, 1945 |
| 2,392,798 | Kleiss | Jan. 8, 1946 |
| 2,418,146 | Upham | Apr. 1, 1947 |